United States Patent [19]
Leman et al.

[11] Patent Number: 5,461,303
[45] Date of Patent: Oct. 24, 1995

[54] POWER FACTOR CORRECTION PRECOMPENSATION CIRCUIT

[75] Inventors: Brooks R. Leman, Santa Clara; Balu Balakrishnan, Saratoga, both of Calif.

[73] Assignee: Power Integrations, Inc., Sunnyvale, Calif.

[21] Appl. No.: 189,422

[22] Filed: Jan. 31, 1994

[51] Int. Cl.⁶ .................................................. G05F 1/652
[52] U.S. Cl. ........................... 323/222; 323/209; 323/303
[58] Field of Search ...................................... 323/209, 210, 323/273, 280, 299, 303, 222

[56] References Cited

U.S. PATENT DOCUMENTS 5,161,097  11/1992  Ikeda ........................................ 323/299
5,282,107  1/1994   Balakrishnan ............................ 361/18
5,367,247  11/1994  Blocher et al. .......................... 323/222

*Primary Examiner*—Peter S. Wong
*Assistant Examiner*—Y. Jessica Han
*Attorney, Agent, or Firm*—Thomas E. Schatzel

[57] ABSTRACT

An embodiment of the present invention is a boost preregulator circuit which includes a bridge rectifier, an inductor, a boost diode and an output capacitor. A power transistor is switched on and off across a junction of the boost inductor and boost rectifier according to a variable duty cycle. Proper variation of the duty cycle results in a power factor corrected AC line current waveform with an in-phase sinusoidal shape.

11 Claims, 4 Drawing Sheets

POWER FACTOR CORRECTION PRECOMPENSATION CIRCUIT

BACKGROUND OF THE INVENTION

1. Field of the Invention

The present invention relates to power factor correction circuits and specifically to low cost implementations of boost preregulator circuits with high power factor, low total harmonic distortion and fixed frequency operation.

2. Description of the Prior Art

Power factor correction places the voltage sinusoid and current sinusoid load on an alternating current (AC) power line in phase. When the two are in phase, the power factor is said to be high, approaching unity. High power factor operation of electrical appliances is desirable, and in some situations, mandatory.

A typical uncorrected power supply exhibits a power factor of about 0.65. Therefore, only sixty five percent of the power that can be drawn from a power line will contribute to real power. For a fifteen amp line service at a nominal 115 volts, this translates to 897 watts of real power. A power supply with an eighty percent operating efficiency connected to a 115 volt AC line can supply no more than 717 watts of real power to a system.

Power factor correction circuits can raise a power supply's power factor to near unity, and thereby provide more real power in a limited environment, e.g., the fifteen amp branch circuit common in residential and commercial buildings. At unity, the current waveform is sinusoidal and nearly all the current drawn from the AC line contributes to real power. For an end user, this may make the difference between using a facility's existing wiring or installing a new service, a twenty or thirty amp branch.

An active power factor corrector must control both the input current and output voltage. Ideally, the input to a converter will appear resistive, such as where the current loop is programmed by the rectified line voltage. The output voltage is controlled by changing the average amplitude of the current programming signal. An analog multiplier, such as is typical in the prior art, can be used to create the current programming signal by multiplying the rectified line voltage with the output of a voltage error amplifier. The current programming signal has the shape of the input voltage and an average amplitude is used to control the output voltage.

A squarer and a divider can be combined with a multiplier in the voltage loop of an active power factor corrector control circuit. The output of the voltage error amplifier is divided by the square of the average input voltage before it is multiplied by a rectified input voltage signal. These extra circuits keep the gain of the voltage loop constant, otherwise, the gain of the voltage loop would change as the square of the average input voltage.

SUMMARY OF THE PRESENT INVENTION

It is therefore an object of the present invention to provide a power factor correction circuit.

Briefly, an embodiment of the present invention is a boost preregulator circuit which includes a bridge rectifier, an inductor, a boost diode and an output capacitor. A power transistor is switched on and off across a junction of the boost inductor and boost rectifier according to a variable duty cycle. Proper variation of the duty cycle results in a power factor corrected AC line current waveform with an in-phase sinusoidal shape.

An advantage of the present invention is a circuit is provided that allows for a simple power factor correction.

A further advantage of the present invention is that a circuit is provided in which load and switching currents need not be monitored for proper power factor correction operation.

A further advantage of the present invention is that a circuit is provided in which complex squarers, dividers and multipliers are not necessary for proper power factor correction operation.

These and other objects and advantages of the present invention will no doubt become obvious to those of ordinary skill in the art after having read the following detailed description of the preferred embodiment which is illustrated in the various drawing figures.

THE DRAWINGS

DETAILED DESCRIPTION OF THE EMBODIMENTS

Figure 1:
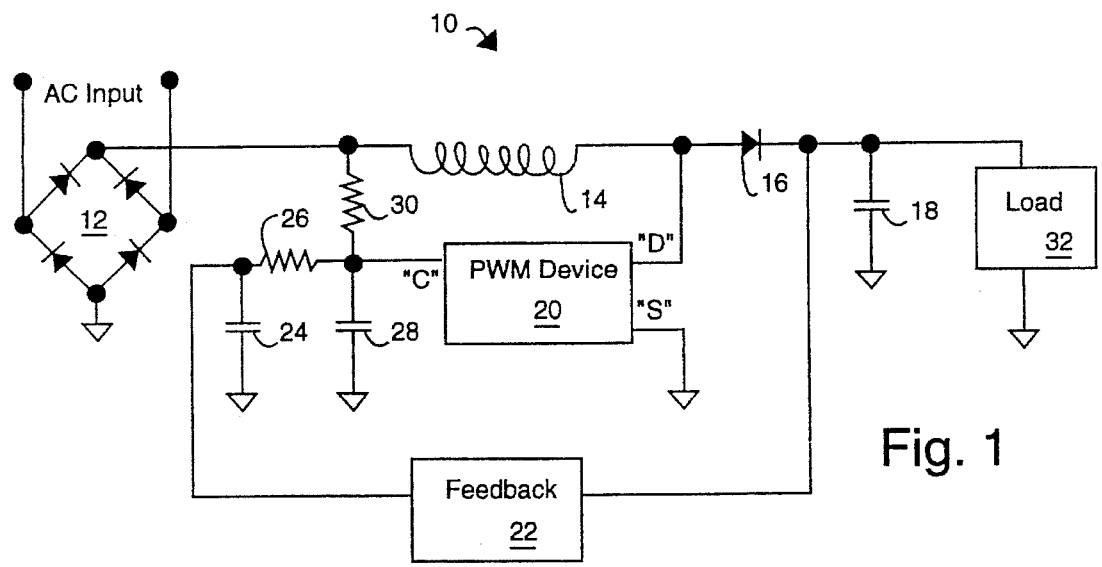
FIG. 1 is a schematic diagram of a power factor correction circuit.

FIG. 1 illustrates a power factor correction (PFC) circuit embodiment of the present invention, referred to by the general reference numeral 10. The PFC circuit 10 comprises a bridge rectifier 12, a boost inductor 14, a boost rectifier 16, an output capacitor 18, a three-terminal pulse-width modulation (PWM) device 20, a voltage feedback circuit 22, a capacitor 24, a resistor 26, a capacitor 28 and a precompensation resistor 30. A load 32 is placed across the output capacitor 18. The three-terminal PWM device 20 includes a power transistor that is duty cycle controlled on and off between its "D" and "S" terminals according to a current driven into its "C" terminal. The duty cycle is proportional to the current that flows through resistor 30, and the value of resistor 30 is therefore critical.

Resistor 30 delivers a current into the "C" terminal of PWM device 20 and is proportional to the instantaneous value of the rectified AC input voltage. Capacitor 28 is a small value capacitor that filters out only higher frequency signals. Resistor 26 is a decoupling resistor that forces current from resistor 30 into the PWM device 20. Capacitor 24 and the voltage feedback circuit 22 provide substantial filtering. The current through resistor 26 varies the average duty cycle of the PWM device 20 over many AC input cycles to maintain a constant average output voltage which is independent of the output load, through the feedback path. On a cycle-by-cycle basis of the incoming AC line frequency, the only duty cycle variation is a linear variation with the rectified AC line voltage. Sensing of the current through either the inductor 14 or PWM device 20 is unnecessary.

Figure 2:
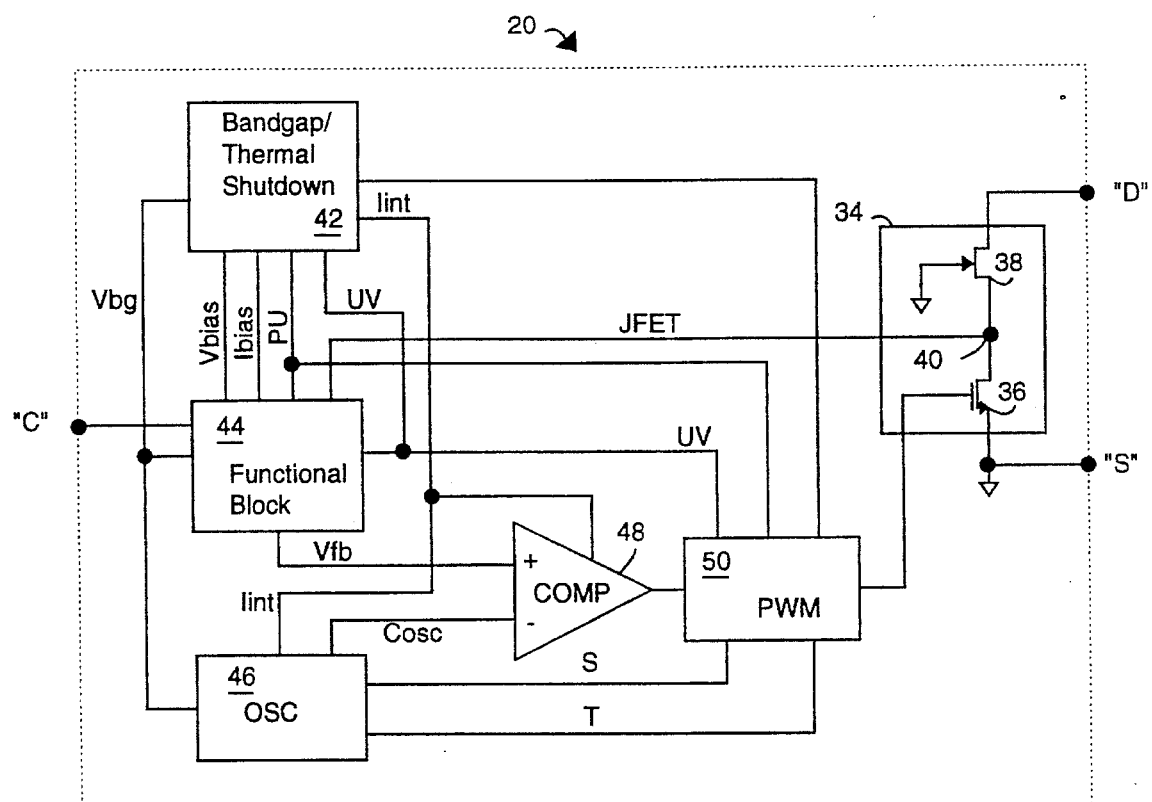
FIG. 2 is a block diagram of the pulse width modulated three-terminal device included in the circuit of FIG. 1.

FIG. 2 is a schematic representation of PWM device 20, which comprises a MOSFET 34 that is preferably similar to that described in U.S. Pat. No. 4,811,075, issued Mar. 7, 1989, to Klas H. Eklund. An insulated-gate, field-effect transistor 36 and a double-sided, junction-gate field-effect transistor 38 are connected in series on the same semiconductor chip to form a high-voltage MOS transistor. A junction 40 provides startup power. An extended drain region is formed on top of a substrate of opposite conductivity material. A top layer of material, similar to the substrate, is formed by ion implantation through the same mask window as the extended drain region. The top layer covers only a middle part of the extended drain which has ends that meet with a silicon dioxide layer above. Current flow through the extended drain is controlled by the substrate and top layer which pinch-off the extended drain between them in a familiar field-effect fashion. The drift region of the main power MOSFET 34 is used to drop the high line voltage to low voltage for biasing three-terminal PWM device 20.

Three-terminal PWM device 20 accepts a combined feedback signal (Ifb) and internal low voltage supply current (Is) on a single pin ("C"). The supply current is typically one milliamp for CMOS versions of three-terminal PWM device 20. The feedback modulation is extracted from the DC supply current within PWM device 20.

The three-terminal PWM device 20 further comprises a bandgap and thermal shutdown 42, a functional block 44, an oscillator (OSC) 46, a comparator (COMP) 48 and a pulse width modulator (PWM) 50. An extracted feedback signal (Vfb) is output from block 44 and applied to COMP 48.

Figure 3:
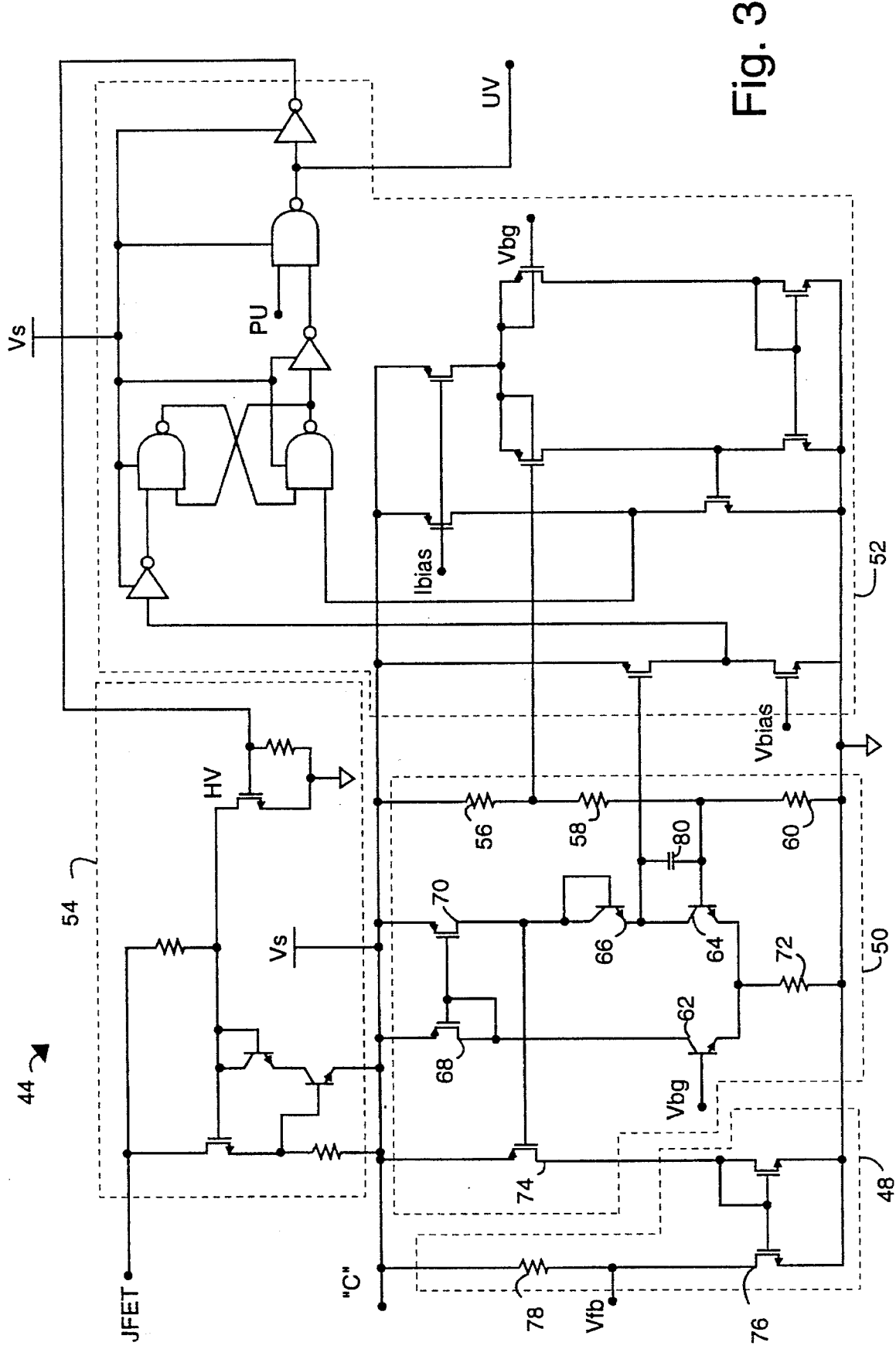
FIG. 3 is a schematic diagram of a portion of the device shown in FIG. 2.

As illustrated in FIG. 3, the functional block 44 comprises a feedback extractor 48, a Vs regulator and switching-noise filter 50, an undervoltage detector 52, and high voltage start-up regulator 54. Regulator and filter 50 regulates the Vs voltage by comparing a bandgap reference voltage (Vbg) to a fraction of voltage Vs, as determined by the ratio of a group of resistors 56, 58 and 60. An error amplifier comprising a set of three transistors 62, 64 and 66, a pair of transistors 68 and 70, and a resistor 72. The output of the error amp drives a shunt transistor 74. As long as there is sufficient supply current being input to "C", the voltage Vs will be in regulation and any excess current will be shunted to ground through transistor 74. This excess current is mirrored and converted into an extracted feedback voltage (Vfb) by a transistor 76 and a resistor 78. During a power-up, the high voltage startup regulator 54 provides the operating current and the voltage to start three-terminal PWM device 20.

An excess current through transistor 74 brings voltage Vfb into the active range of a sawtooth signal (1–2 volts) from OSC 46, which is applied to the inverting input of COMP 48. When Vfb is above the normal active range, a maximum-on pulse width is sent to the output switch MOSFET 34. When Vfb is at or below the active range, the pulse width sent to MOSFET 34 will be minimum or zero. The feedback loop automatically adjusts the pulse width to remain in the active range.

Stray switching currents in the Vs node from OSC 46, PWM 50 and power MOSFET 34 must be prevented from contaminating Vfb output. A low pass filter is included in regulator and filter 50 using a miller capacitor 80 coupled to transistor 64. The cutoff frequency is approximately five KHz, which is low enough to effectively filter the high frequency switching noise (e.g., 48 KHz to 500 KHz) from modulating the gate of transistor 74. However, this cutoff is high enough compared to the dominant pole of the regulator loop (e.g., 0.1 Hz to 48 Hz) so as to not affect the closed loop servo control stability.

U.S. patent application Ser. No. 07/938,704, filed Sep. 1, 1992, and titled, "THREE-TERMINAL SWITCHED MODE POWER SUPPLY INTEGRATED CIRCUIT", provides further details of the three-terminal PWM device 20 and is incorporated herein by reference as if fully set forth.

PWM device 20 is not necessarily limited to the type shown in FIGS. 2 and 3. The duty cycle of switching between terminals "D" and "S" is a function of the control current driven into the control pin, terminal "C". In one implementation, an increasing current into the control pin decreases the duty cycle. Other commercially available pulse width modulated power supply integrated circuit devices with either internal or external MOSFET switches can be used in place of PWM device 20.

Boost power factor circuits are typically operated between twenty kilohertz and 500 kilohertz, which is very high compared to ordinary AC line frequencies. By switching at such high frequencies, the input voltage can be considered constant from cycle to cycle of the switching frequency. PWM device 20 turns on for a time $T_{on}$ that causes current in inductor 14 to linearly ramp up. When PWM device 20 turns off between terminals "D" and "S", the inductor 14 induces a reverse voltage that forward biases diode 16. The diode current then ramps down to zero. The output capacitor 18 is sized to prevent significant changes in the DC output voltage between successive peak current pulses. Where the duty cycle of PWM device 20 is kept constant over an entire line frequency cycle period, the average filtered value of the current flowing in PWM device 20 will be sinusoidal. The average current through boost diode 16 does not have a sinusoidal character. The current through the boost inductor 14 is the sum of the currents through both the diode 16 and the PWM device 20, and will not have the desired target sinusoidal average shape if the duty cycle within PWM device 20 remains fixed. The duty cycle within PWM device 20 must be varied with the rectified line frequency input voltage to reduce the total harmonic distortion (THD) and to improve power factor. The target duty cycle for each high frequency switching cycle must be determined.

The average value of the $N^{th}$ switching cycle switch current can be found from equation (1) where "D" is the duty cycle, "$I_{pk}$" is the peak transistor current, "$V_{in}$" is the instantaneous input voltage for the $N^{th}$ switching cycle, "$F_s$" is the switching frequency and "$L_p$" is the inductance, $$Iq(\text{avg}) = Ipk \frac{D}{2}. \tag{1}$$

The peak current $I_{pk}$ can be found from, $$Ipk = \frac{Vin\, D}{Fs\, Lp}. \tag{2}$$

The average value of the $N^{th}$ switching cycle diode current can be found from equation (3), where $V_o$ is the average output voltage $$Id(\text{avg}) = \frac{Ipk^2\, Lp\, Fs}{2\,(Vo - Vin)}. \tag{3}$$

These two average currents sum in the inductor 14 to become an average inductor current. For a given power level, the $N^{th}$ interval instantaneous input voltage demands a target average current. The average current value is the average of the switching current and is equal to the $N^{th}$ interval instantaneous input current. The equations can be rearranged and solved for the duty cycle D as a function of completely independent variables, as in, $$I(\text{avg}) = Iq(\text{avg}) + Id(\text{avg}), \quad (4)$$

$$D = \sqrt{\frac{2\,Fs\,Lp\,I_{avg}\,(V_o - V_{in})}{V_o\,V_{in}}}. \quad (5)$$

This function can be approximated with a linear variation of duty cycle with the rectified AC input voltage.

Figure 4:
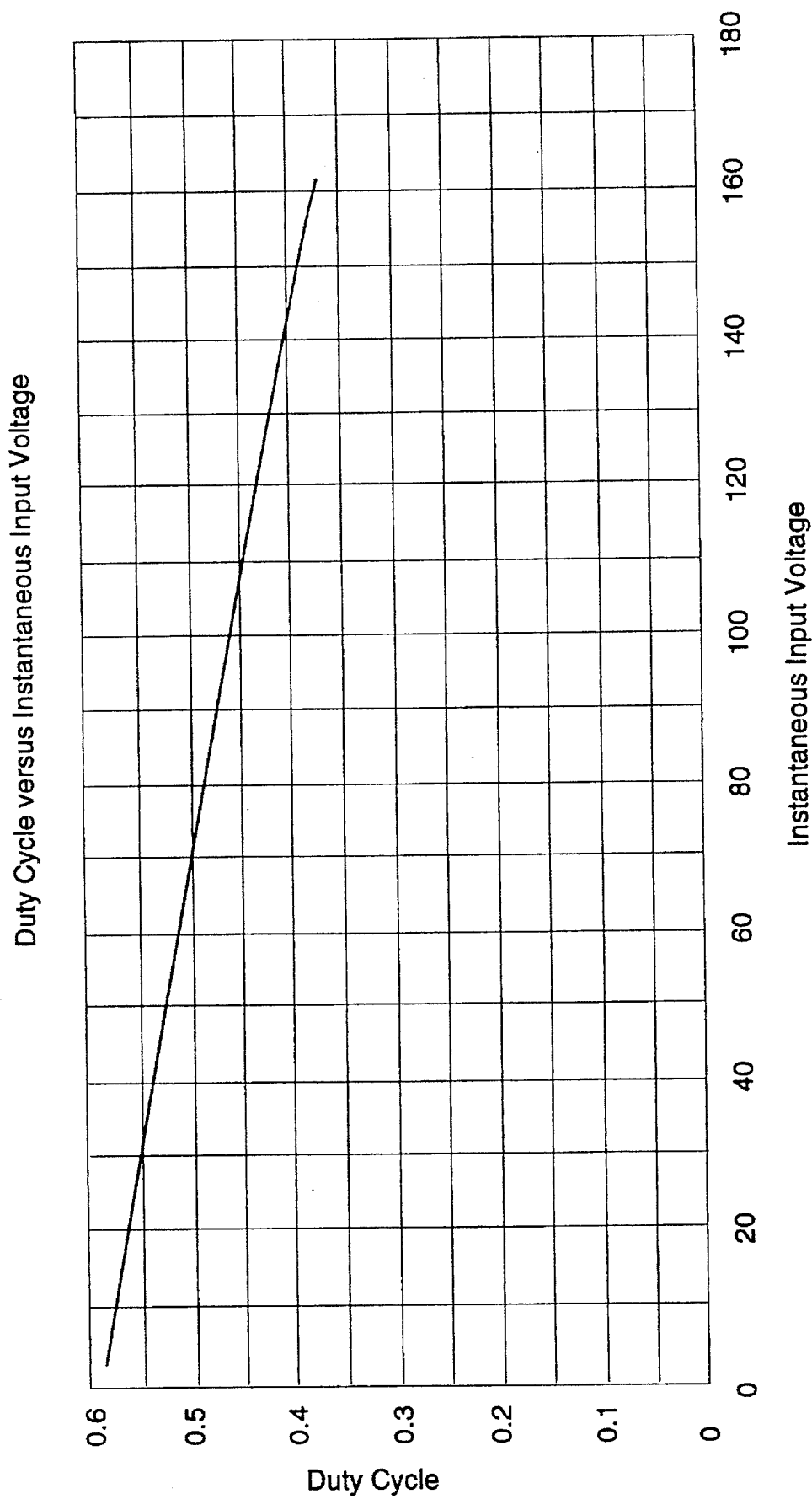
FIG. 4 is a graphical representation of equation (5)

FIG. 4 is a graphical representation of equation (5).

Figure 5:
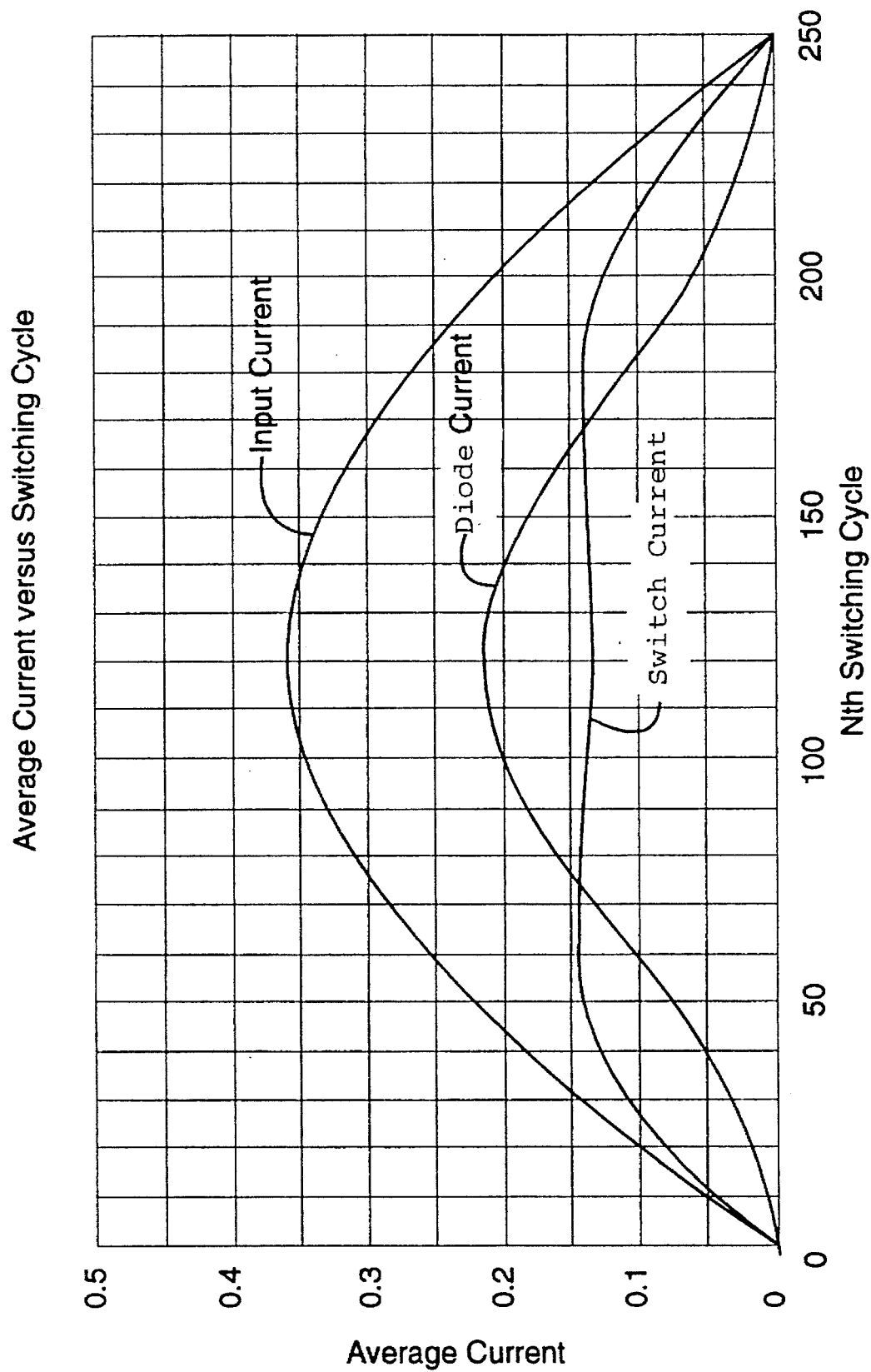
FIG. 5 is graphical representation of the input current, diode current and switch current in the circuit of FIG. 1.

FIG. 5 illustrates the expected waveforms for the input current, diode current and switch current in the circuit of FIG. 1.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A power factor correction circuit for connection to an alternating current power line source, comprising:

a rectifier having an input connection for alternating current (AC) power with a first frequency and a full-wave rectified voltage output with a common reference connection;

a boost inductor connected to said output of the rectifier;

a boost rectifier connected to the boost inductor and for providing a direct current output voltage;

a pulse-width modulated (PWM) device with a switch connected between said common reference connection and a junction of the boost inductor and the boost rectifier and providing for continuously variable duty-cycle on-off control of said switch at a second frequency that is fixed and substantially higher than said first frequency according to a control signal to an input; and a precomensation resistor connected between said full-wave rectified voltage output of the rectifier and said control signal input of the PWM device, and providing for linear duty-cycle variations of the PWM device that are in part affected by the instantaneous signal magnitude of said full-wave rectified output of the rectifier, wherein the average duty cycle of PWM device is constant over many cycles of said first frequency and an average filtered value of a current flowing in said boost inductor is sinusoidal.

2. The circuit of claim 1, wherein:

the average value of an $N^{th}$ switching cycle switch current in the PWM device $$Ipk = \frac{Vin\,D}{Fs\,Lp},$$

where "D" is the duty cycle, "$I_{q(avg)}$" is the average value of the $N^{th}$ switching cycle switch current, "Id" is the average value of the $N^{th}$ switching cycle diode current, "I(avg)" is the average value of the $N^{th}$ switching cycle switch and diode current, "$I_{pk}$" is the peak transistor current, "$V_{in}$" is the instantaneous input voltage for the $N^{th}$ switching cycle, "$F_s$" is the switching frequency and "$L_p$" is the inductance, $$Iq(\text{avg}) = Ipk\,\frac{D}{2},$$

and the peak current is $I_{pk}$.

3. The circuit of claim 2, wherein:

the boost rectifier has an average value of the $N^{th}$ switching cycle current that is, $$Id(\text{avg}) = \frac{Ipk^2\,Lp\,Fs}{2\,(V_o - V_{in})}$$

where "$V_o$" is the average output voltage.

4. The circuit of claim 3, wherein:

the boost inductor provides for the summing of a pair of currents to become an average inductor current, such that for a given power level, the $N^{th}$ interval instantaneous input voltage demands a target average current, and the average current value is the average of the switching current and is equal to the $N^{th}$ interval instantaneous input current, as in, $$I(\text{avg}) = Iq(\text{avg}) + Id(\text{avg}), \text{ and}$$

$$D = \sqrt{\frac{2\,Fs\,Lp\,I_{avg}\,(V_o - V_{in})}{V_o\,V_{in}}}.$$

5. The circuit of claim 1, wherein:

the precompensation resistor generates a precompensation current proportional to the instantaneous rectified AC input voltage and causes the duty cycle of the PWM device to vary in response.

6. The circuit of claim 1, further comprising:

a high frequency filter capacitor connected across said control input of the PWM device which has an insignificant effect at line frequencies of the AC power input.

7. The circuit of claim 1, further comprising:

an output capacitor connected across the direct current output of the boost rectifier and said common reference.

8. The circuit of claim 1, wherein:

the PWM device is a three terminal device with said switch comprising a switching transistor internally connected between two of its terminals and said control signal input for its third terminal.

9. A power factor correction circuit for connection to an alternating current power line source, comprising:

a rectifier having an input connection for an incoming alternating current (AC) power with a line frequency and a direct current (DC) output of rectified AC line voltage;

a boost inductor connected to said DC output of the rectifier;

a boost rectifier connected to the boost inductor and for providing a direct current output voltage;

a pulse width modulated switching (PWM) device connected to a junction of the boost inductor and boost rectifier and having a control input with means for proportionately pulse width modulating of a switch between said junction and a circuit common at a fixed frequency wherein said modulating has a duty cycle that varies linearly with signals applied to said control input; and a precompensation resistor connected between said DC output of the rectifier and said control input of the PWM device, and providing for duty cycle variations that are linear with instantaneous magnitudes of said rectified AC line voltage with a frequency that does not vary;

wherein, average current in he boost inductor is forced by the varying said duty cycle of said pulse width modulation to said switch to approach unity power factor, and the average value of an Nth switching cycle switch current in the PWM device can be represented by an equation, where "D" is the duty cycle, "$I_{q(avg)}$" is the average value of the Nth switching cycle switch current, "Id" is the average value of the Nth switching cycle diode current, "I(avg)" is the average value of the Nth switching cycle switch and diode current, "Ipk" is the peak transistor current, "$V_{in}$" is the instantaneous input voltage for the $N^{th}$ switching cycle, "$F_s$" is the switching frequency and "$L_p$" is the inductance $$Iq(\text{avg}) = Ipk \frac{D}{2}$$

and the peak current $I_{pk}$ can be found from, $$Ipk = \frac{Vin\, D}{Fs\, Lp}\ .$$

10. The circuit of claim 9, wherein:

the boost rectifier has an average value said $N^{th}$ switching cycle current that is, $$Id(\text{avg}) = \frac{Ipk^2\, Lp\, Fs}{2\,(Vo - Vin)}$$

where "$V_o$" is the average output voltage.

11. The circuit of claim 10, wherein:

the boost inductor provides for summing of two average currents to become an average inductor current, such that for a given power level, the $N^{th}$ interval instantaneous input voltage demands a target average current, and the average current value is the average of the switching current and is equal to the $N^{th}$ interval instantaneous input current, as in, $$I(\text{avg}) = Iq(\text{avg}) + Id(\text{avg}),\ \text{and}$$

$$D = \sqrt{\frac{2\, Fs\, Lp\, I_{avg}\,(V_o - V_{in})}{V_o\, V_{in}}}\ .$$

\* \* \* \* \*